United States Patent
Takei et al.

(10) Patent No.: US 8,863,642 B2
(45) Date of Patent: Oct. 21, 2014

(54) DEVICE FOR CONTROLLING THE STROKE OF AN ACTUATOR

(75) Inventors: Yoshihiro Takei, Kanagawa (JP); Yasushi Yamamoto, Kanagawa (JP); Hiroyuki Kawanishi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 855 days.

(21) Appl. No.: 12/998,114

(22) PCT Filed: Sep. 16, 2009

(86) PCT No.: PCT/JP2009/066139
§ 371 (c)(1), (2), (4) Date: Mar. 18, 2011

(87) PCT Pub. No.: WO2010/032743
PCT Pub. Date: Mar. 25, 2010

(65) Prior Publication Data
US 2011/0168011 A1 Jul. 14, 2011

(30) Foreign Application Priority Data
Sep. 19, 2008 (JP) ................................ 2008-240949

(51) Int. Cl.
| | |
|---|---|
| F15B 9/09 | (2006.01) |
| F15B 21/08 | (2006.01) |
| F16K 31/06 | (2006.01) |
| F16D 48/06 | (2006.01) |
| F16K 11/07 | (2006.01) |
| F16D 25/08 | (2006.01) |
| F16K 37/00 | (2006.01) |
| F16D 48/02 | (2006.01) |

(52) U.S. Cl.
CPC .............. *F16D 48/02* (2013.01); *F15B 21/087* (2013.01); *F16K 31/0613* (2013.01);
(Continued)

(58) Field of Classification Search
CPC .......... F15B 9/03; F15B 9/09; F15B 13/0442; F15B 2211/6656; F15B 21/087; F16D 48/066; F16D 48/02; F16D 25/088; F16D 2500/1027; F16D 2500/7041; F16D 2500/3026; F16D 2500/3025; F16D 2048/0209; F16D 2500/3022; F16K 37/0041; F16K 11/07; F16K 31/0613
USPC ............................................... 91/363 R, 361
See application file for complete search history.

(56) References Cited

U.S. PATENT DOCUMENTS 4,813,335 A * 3/1989 Wakiya et al. ................... 91/361
5,562,071 A    10/1996 Urushihata et al.

FOREIGN PATENT DOCUMENTS

| JP | 2-165304 A | 6/1990 |
| JP | 6-299813 A | 10/1994 |

(Continued)

*Primary Examiner* — Ned Landrum
*Assistant Examiner* — Logan Kraft
(74) *Attorney, Agent, or Firm* — McGinn IP Law Group, PLLC (57) ABSTRACT

This invention relates to a feedback control device for controlling the stroke of an actuator stroke driven by a working fluid. The feedback control device for controlling the stroke correctly controls the stroke using a simple means by compensating secular changes in the flow rate control valve that controls the working fluid. The device for controlling the stroke of an actuator 110 is provided with a single flow rate control valve 1 for controlling the feed and discharge of the working fluid, and the flow rate control valve is operated to control the stroke by feedback. The flow rate control valve 1 has a neutral position where the working fluid is neither fed nor discharged, and a flow rate control valve control device 9 is provided with a learning device 91 for learning variations in the neutral position. The feedback control is executed, i.e., the flow rate control valve 1 is operated by adding a value of the neutral position learned by the learning device 91 to the feedback operation amount output by a PID operation unit 94, whereby a change in the flow rate characteristics caused by secular change is compensated.

2 Claims, 10 Drawing Sheets

(52) U.S. Cl.
CPC . *F16D 2500/3026* (2013.01); *F16D 2500/7041* (2013.01); *F16D 48/066* (2013.01); *F16K 11/07* (2013.01); *F16D 2500/3022* (2013.01); *F16D 2048/0209* (2013.01); *F16D 25/088* (2013.01); *F16K 37/0041* (2013.01); *F16D 2500/3025* (2013.01); *F16D 2500/1027* (2013.01)
USPC .......................................... 91/363 R; 91/361

(56) References Cited

FOREIGN PATENT DOCUMENTS

| | | |
|---|---|---|
| JP | 8-74530 A | 3/1996 |
| JP | 10-220258 A | 8/1998 |
| JP | 11-108081 A | 4/1999 |
| JP | 11-108082 A | 4/1999 |
| JP | 11-173349 A | 6/1999 |

* cited by examiner

DEVICE FOR CONTROLLING THE STROKE OF AN ACTUATOR

TECHNICAL FIELD TO WHICH THE INVENTION BELONGS

This invention relates to a device for controlling the stroke of an actuator that is driven by a fluid pressure by using a flow rate control valve like a clutch control device which automatically connects and disconnects a clutch provided in a vehicle by using a clutch actuator.

BACKGROUND ART

For easy driving of a vehicle and for reducing fatigue to the driver, various kinds of power transmission devices for vehicles have, in recent years, been widely used for easy driving. A representative example will be a so-called automatic transmission (AT) combining a torque converter and a planetary gear device together. A power transmission device which uses a transmission of the type of parallel shaft gear mechanism similar to the so-called manual transmission (MT) in combination with an automatic clutch, is one of such automatic power transmission devices for vehicles. In this power transmission device, a clutch disposed between an engine and a transmission is provided with a clutch actuator, and the clutch is automatically disconnected and connected at the time when the driver changes the speed by shifting the gear by using a shift lever or at the start of the vehicle eliminating the need of operating the clutch pedal by the driver. There has been further proposed a power transmission device which automatically shifts the gear depending upon the traveling condition of the vehicle by using an electronically controlled device obviating the need of operating the shift lever by the driver.

Figure 4:
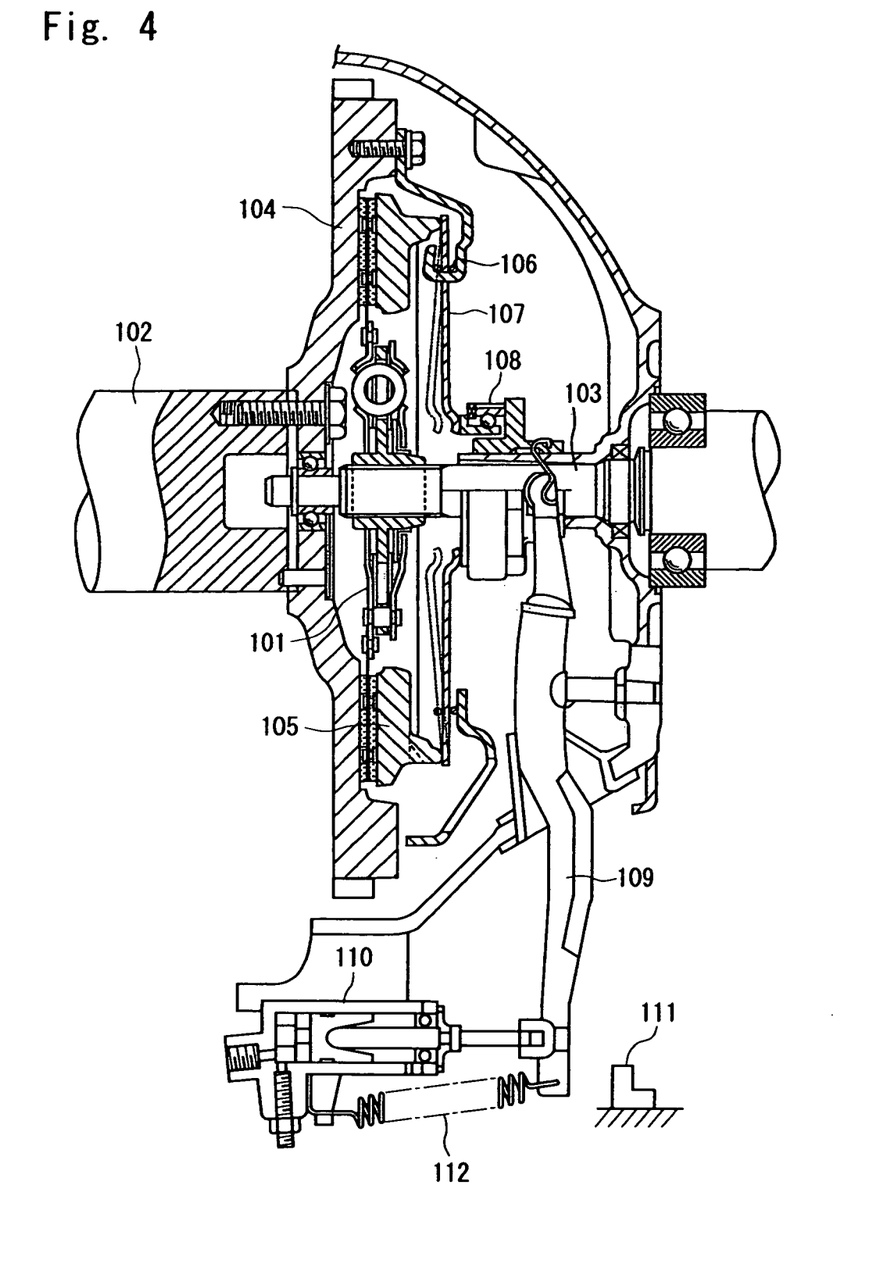
[FIG. 4] is a view showing the constitution of a clutch for a vehicle.

A clutch (dry type single disk clutch) installed between an engine and a transmission is provided with a clutch disk 101 which has a friction disk fixed to the peripheral portion thereof as shown in FIG. 4. The clutch is slidably spline fitted to a transmission input shaft 103 rotatably supported by a crankshaft 102 of the engine. A pressure plate 105 is provided on the back of the friction disk of the clutch disk 101 to bring the friction disk into pressed contact with a flywheel 104 at the rear end of the crankshaft 102. Further, a diaphragm spring 107 is attached to a clutch cover 106 that is fixed to the flywheel 104. When the vehicle is normally traveling, the diaphragm spring 107 brings the clutch disk 101 into pressed contact with the flywheel 104 via the pressure plate 105 and, therefore, the engine power is transmitted to the transmission input shaft 103 via the clutch disk 101.

The clutch is equipped with an operation mechanism for disconnecting and connecting the transmission of power, and the operation mechanism is constituted by a release bearing 108 fitted onto the transmission input shaft 103, a release fork 109, a clutch actuator 110 and the like. The clutch actuator 110 is a fluid pressure cylinder operated by a pneumatic pressure or a hydraulic pressure, and its piston is coupled to one end of the release fork 109. Provision is, further, made of a stopper 111 for mechanically limiting the movement in order to prevent the occurrence of damage to the clutch actuator 110 and the like caused by excessively large movement of the piston.

At the time of cutting off the engine power for shifting the gear of the transmission, the working fluid is fed to the clutch actuator 110 to displace one end of the release fork 109 toward the right in the drawing. The other end of the release fork 109 displaces toward the opposite direction, causing the release bearing 108 coming in contact therewith to slide leftward so that the diaphragm spring 107 moves as represented by a two-dot chain line in the drawing. Therefore, the spring force that pushes the pressure plate 105 is released, and the transmission of the engine power to the transmission input shaft 103 is cut off. To connect the clutch again after having finished the gear shift, the working fluid in the clutch actuator 110 is discharged, and the release fork 109 is moved leftward by a return spring 112 or the like. The state of connecting the clutch (rate of connection) is determined by the movement of the piston of the clutch actuator 110, i.e., by the stroke of the clutch actuator.

At the time of gear shifting, the clutch must be disconnected and connected quickly without causing shift shock. Therefore, at the time of connecting again the clutch that is once disconnected after having shifted the gear (after the gears are engaged), the piston of the clutch, actuator 110 is, first, quickly moved in a direction of connection so as to quickly pass through an invalid region where the torque is not substantially transmitted, and the rate of connection is gradually increased in the so-called half-engage clutch region where the torque starts transmitting in order to avoid the shift shock caused by a sharp increase in the rate of connection as illustrated in a graph of FIG. 5 that shows changes in the stroke. The above control is, in many cases, executed by a feedback control that varies the amount of the working fluid in the clutch actuator 110 depending upon a deviation from a target stoke by detecting, by using a stroke sensor 7, a real stroke which is a practical displacement of the clutch actuator 110 so as to correctly control the stroke thereof.

A clutch control device which automatically disconnects and connects the clutch at the time of gear shifting is provided with a working fluid pressure source such as an air tank that feeds the working fluid, a stroke sensor for detecting the movement of the piston of the clutch actuator, and control valves for controlling the amount of the working fluid in the clutch actuator. The clutch control device executes the clutch control at the time of gear shifting. Usually, the control valves are arranged in the working fluid feed pipe and in the discharge pipe, respectively. The rate of connection of the clutch is controlled by opening and closing these two control valves. There has also been known a clutch control device which feeds and discharges the working fluid in the clutch actuator by using a single flow rate control valve as disclosed in, for example, Japanese Patent No. 3417823.

Figure 6:
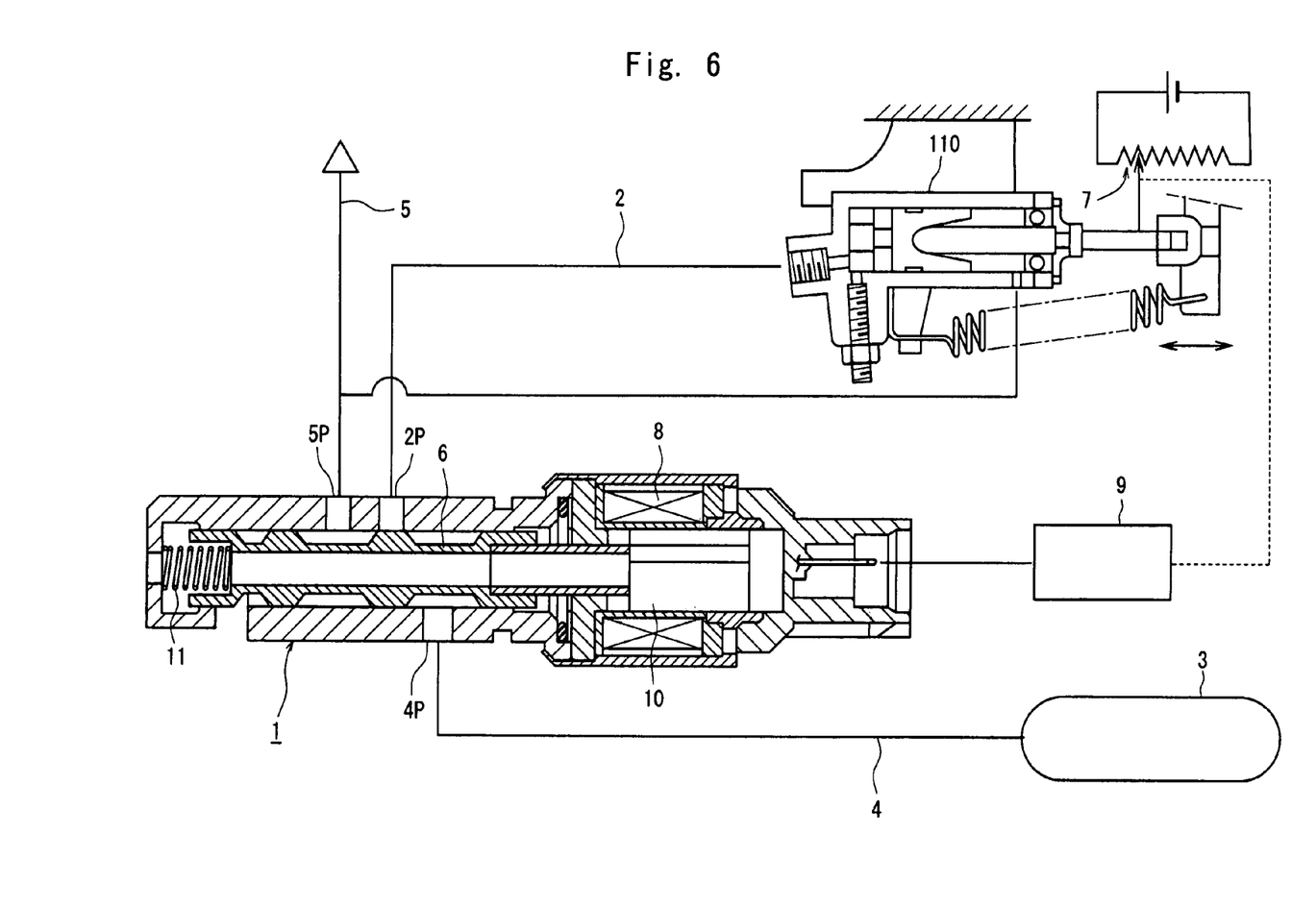
[FIG. 6] is a circuit diagram of a conventional device for controlling the clutch actuator.

In the clutch control device that uses a single flow rate control valve as shown in a circuit diagram of FIG. 6, the flow rate control valve 1 is connected to a communication passage 2 communicated with the clutch actuator 110, to a pressure source passage 4 communicated with the working fluid pressure source 3 such as an air tank, and to a discharge passage 5 for discharging the working fluid from the clutch actuator 110 and, further, includes three ports, i.e., a communication port $2p$, a pressure source port $4p$ and a discharge port $5p$ formed therein and opened to the respective passages.

The flow rate control valve 1 of FIG. 6 is a proportional control valve of the type of slide valve equipped with a drive device of the type of electromagnetic solenoid which works as a valve actuator for operating a valve body 6. Namely, the flow control valve 1 has such flow rate characteristics that the flow rate of the working fluid that flows therethrough varies depending upon the position of the valve body 6. The amount of electric current flowing into the electromagnetic solenoid serves as an operation amount for varying the flow rate. In order to control the stroke of the clutch, a flow rate control valve control device 9 is connected to the flow rate control valve 1 to set the position of the valve body 6 by controlling the amount of electric current to a coil 8 depending upon a deviation between a real stroke detected by the stroke sensor 7 and the target stroke.

Figure 7:
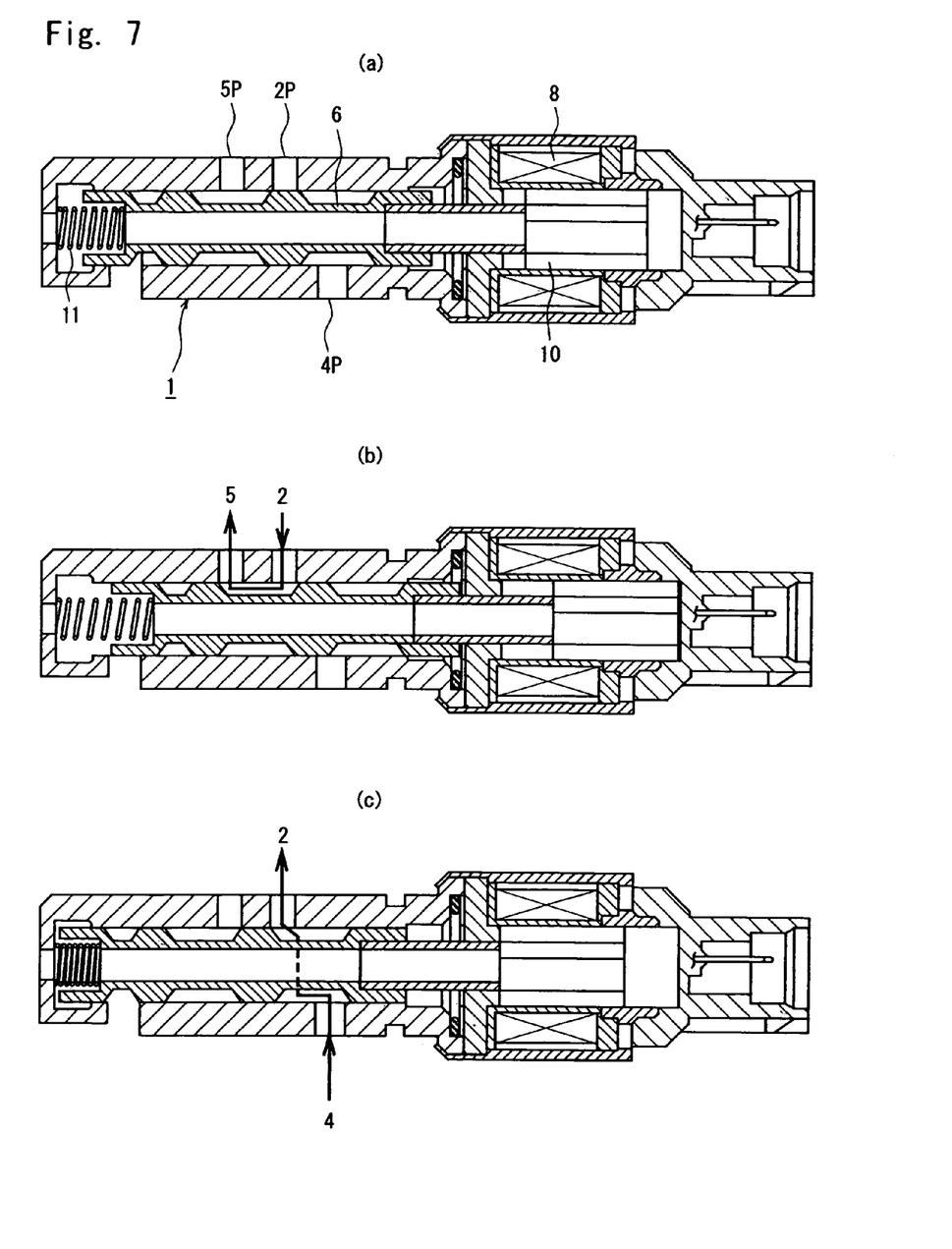
[FIG. 7] is a view closely illustrating the operation of a flow rate control valve in the actuator control device.

As shown in detail in the operation view of FIG. 7, the valve body 6 of the flow rate control valve 1 has two lands on the way thereof, one end of the valve body 6 being coupled to a moving yoke 10 of the electromagnetic solenoid. A spring 11 is arranged at the other end of the valve body 6, and the position of the valve body 1 is determined by a balance between the magnetic force acting on the moving yoke 10 and the resilient force of the spring 11. When the flow of current to the coil 8 is interrupted (amount of current, 0%), the valve body 6 is pushed by the spring 11 and assumes a position shown in FIG. 7(b) whereby the communication port 2p communicates with the discharge port 5p, and the working fluid in the clutch actuator 110 is discharged to the exterior permitting the clutch to be connected. If the electric current flowing into the coil 8 assumes a maximum value (100%), the valve body 6 is brought to a position shown in FIG. 7(c) compressing the spring 11, and the communication port 2p communicates with the pressure source port 4p. Therefore, the working fluid in the pressure source 3 is introduced into the clutch actuator 110 through the communication port 2p, and the clutch is disconnected. When a 50%-current flows into the coil 8, the valve body 6 has been designed to be brought to a position of FIG. 7(a), i.e., brought to the neutral position. At this moment, the communication port 2p is cut off from the power source port 4p and the discharge port 5p; i.e., the stroke of the clutch is maintained in position.

Figure 5:
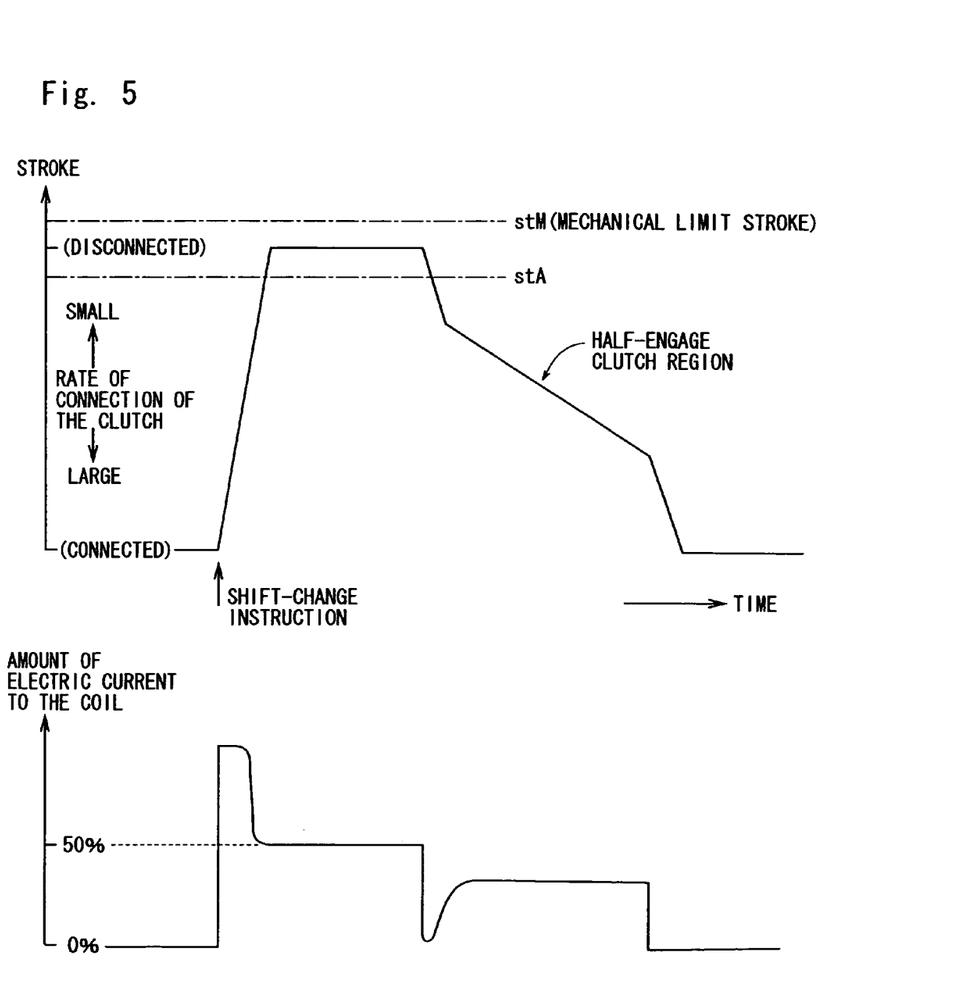
[FIG. 5] is a diagram illustrating an embodiment of controlling the stroke of the clutch actuator.

Described below is a relationship between the position of the valve body of the flow rate control valve 1 and the flow rate. When the valve body is at the neutral position in FIG. 7(a) in the flow rate control valve in which the length L of the land is the same as the width W of the communication port 2p, the working fluid readily starts flowing if the valve body is deviated toward the right or the left from the neutral position. In this flow rate control valve, the flow rate characteristics or the flow rate of the working fluid relative to the electric current flowing into the coil 8 become as represented by a solid line in FIG. 8, and the neutral position at which the flow rate becomes 0 is limited to one point at which the amount of electric current to the coil 8 becomes 50%. When the stroke of the clutch is controlled at the time of gear shifting as shown in FIG. 5 by using the above flow rate control valve, the amount of electric current to the coil 8 varies according to a pattern shown on the lower side in FIG. 5. Some flow rate control valves may have a length L of land which is larger than the width W of the communication port 2p by only a small amount. In this case, the flow rate characteristics become as represented by a two-dot chain line in FIG. 7, and a so-called dead zone DZ is made present in which the flow rate remain unchanged despite the operation amount is varied. When the above flow rate control valve is used, the amount of electric current to the coil increases or decreases by only an amount that corresponds to one-half the width of the dead zone DZ.

Here, the control device for controlling the stroke of the actuator such as a fluid pressure cylinder by using a single flow rate control valve is not limited to the clutch control device that disconnects and connects the clutch mounted on the vehicles. For instance, a tail gate is provided at the rear end of the rear body of a truck to load and unload cargos on and off the rear body, and is moved up and down by also using a hydraulic pressure cylinder which is often controlled for its stroke by using a single flow rate control valve.

PRIOR ART DOCUMENT

Patent Document:
    Patent document 1: Japanese Patent No. 3417823

OUTLINE OF THE INVENTION

Problems that the Invention is to Solve

Figure 9:
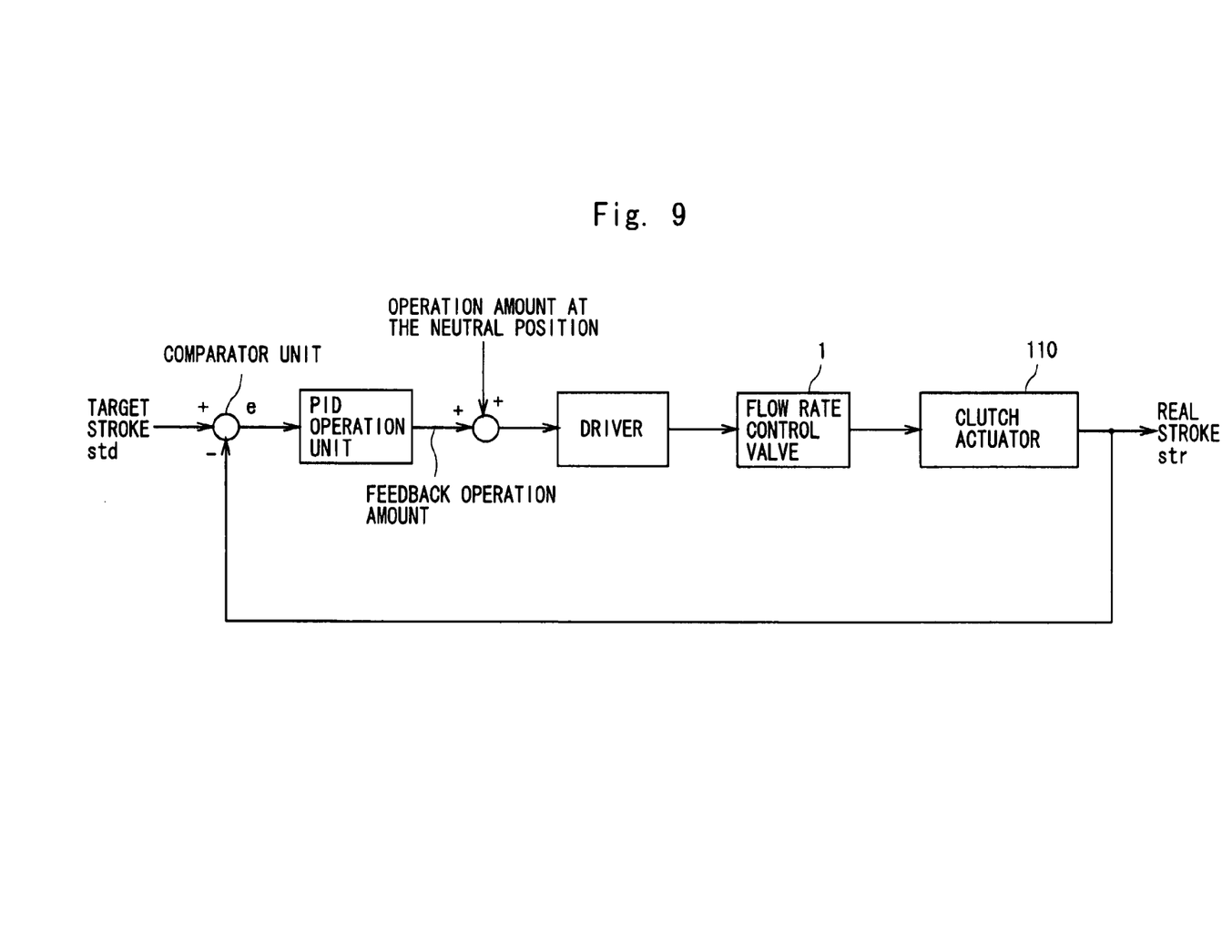
[FIG. 9] is a block diagram of a conventional device for controlling the stroke of the actuator.

Usually, it is required that the stroke of the actuator be quickly and correctly controlled. To correctly control the rate of connection of the clutch, for example, it is required to quickly and correctly control the amount of the working fluid in the clutch actuator by using the flow rate control valves. When the stroke of the clutch actuator is to be controlled by feedback control, the stroke that varies as shown in FIG. 5 becomes a target stroke, and a real stroke detected by a stroke sensor is so controlled as to follow up the target stroke. FIG. 9 is a block diagram for controlling the stroke of the clutch actuator by feedback control.

A target stroke std is input to the control device, and a comparator unit subtracts a real stroke str that is detected by the stroke sensor and is fed back to calculate a deviation e between the two. The deviation e is input to a PID operation unit where an amount proportional to the deviation e is found as a feedback operation amount. To the feedback operation amount, there are often added an amount obtained by integrating the deviation e with time and an amount obtained by differentiating the deviation e with time.

Figure 8:
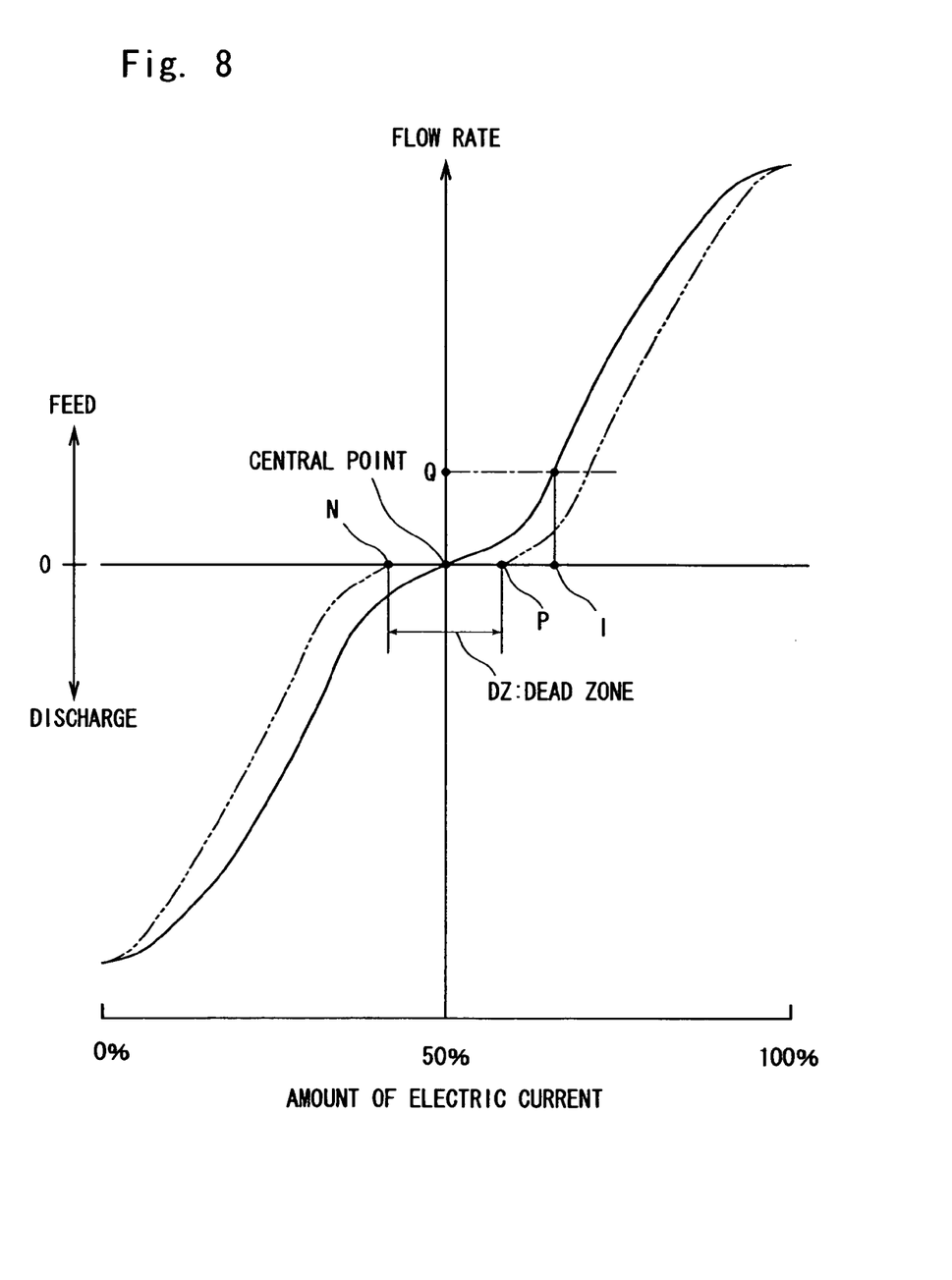
[FIG. 8] is a diagram illustrating flow rate characteristics of the flow rate control valve.

Operating the feedback operation amount in the PID operation unit represents finding the amount of electric current I corresponding to a flow rate Q that becomes the target stroke std after the passage of a predetermined period of time from the flow rate characteristics of FIG. 8. With the 50%-electric current at the neutral position where the flow rate is 0 as a reference, the feedback operation amount is calculated as the amount of electric current of a difference therefrom. An operation amount is obtained by adding the reference electric current at the neutral position as a feed-forward amount to the feedback operation amount, and is input to a driver that feeds an electric current to the electromagnetic solenoid of a valve actuator. The driver feeds the amount of electric current corresponding to the operation amount to the electromagnetic solenoid whereby the position of the valve body varies in the flow rate control valve, the amount of the working fluid in the clutch actuator is controlled, and the real stroke str comes into agreement with the target stroke std.

Here, the flow rate control valves have been so designed that their flow rate characteristics representing relationships between the amount of electric current and the flow rate remain constant depending upon the types of the valves, and that the amounts of electric current remain constant at their neutral positions. However, the individual flow rate control valves differ to some extent due to slight difference in the production process, and their flow rate characteristics differ to a slight degree from the designed characteristics depending upon the individual flow rate control valves. Further, even the same flow rate control valve may undergo a change in the flow rate characteristics due to secular change. For instance, a balance varies between the magnetic force of the electromagnetic solenoid and the spring due to secular change. In case the magnetic force has decreased, the solid line representing the flow rate characteristics in FIG. 10 moves toward the right (broken line X). In case the force of the spring has decreased, the solid line moves toward the left (broken line Y). Therefore, the amount of electric current at the neutral position of the flow rate control valve, too, similarly moves from the designed amount of electric current (50% in this embodiment). If the flow rate characteristics vary, the flow rate varies despite the amount of the electric current is maintained the same. In the feedback control, therefore, there takes place a variation in the amount of change in the stroke that corresponds to the feedback operation amount. The variation adversely affects the stroke follow-up control performance; i.e., response characteristics are deteriorated making it difficult to attain quick follow-up performance or the stability of control is impaired. Therefore, the rate of connection of the clutch cannot be quickly and correctly brought to a target value, often bringing about shift shocks.

The present invention solves the above-mentioned problem that occurs when the stroke of the actuator is controlled by using a flow rate control valve having a neutral position, such as clutch control device and the like device, relying upon a simple means.

Means for Solving the Problem

In view of the above problem, the present invention provides a feedback control device for controlling the stroke of an actuator, wherein a flow rate control valve control device is provided with a learning device that learns variation in the neutral position of a flow rate control valve, the operation amount of the learned neutral position is added to the feedback operation amount to control the flow rate control valve, and a difference in the flow rate characteristics is compensated to correctly control the stroke of the actuator relying on a simple means. Namely, the present invention is concerned with a device for controlling the stroke of an actuator driven by a working fluid, wherein:

the device for controlling the stroke comprises a flow rate control valve for controlling the amount of the working fluid in the actuator, a valve actuator for operating a valve body of the flow rate control valve, a stroke sensor for detecting a real stroke of the actuator, a target stroke-setting means for setting a target stroke of the actuator, and a flow rate control valve control device for controlling the valve actuator depending upon a feedback operation amount operated based on a deviation between the real stroke of the actuator and the target stroke; wherein the flow rate control valve is connected to a communication passage communicated with the actuator, to a pressure source passage communicated with a working fluid pressure source, and to a discharge passage for discharging the working fluid from the actuator, and is so constituted that, at the neutral position of the valve body, the communication passage is cut off from the pressure source passage and the discharge passage, and the flow rate control valve control device learns, as the operation amount at the neutral position, an operation amount of the valve actuator at a moment when a rate of change in the detection signal of the stroke sensor becomes smaller than a predetermined value, and controls the valve actuator by correcting the feedback operation amount by the operation amount at the learned neutral position.

As described in claim 2, it is desired that the feedback operation amount is operated as an amount proportional to a deviation between the real stroke of the actuator and the target stroke.

As described in claim 3, the invention is suitably adapted to a device for controlling the stroke of a clutch actuator for operating the clutch installed between an engine and a transmission in the power transmission device for vehicle. When the clutch actuator is provided with a stopper and the stroke thereof includes a limit stroke that is mechanically limited, the device for learning the neutral position executes the learning if the stroke of the clutch actuator is greater than a predetermined stroke but is smaller than the limit stroke as described in claim 4.

Effects of the Invention

When the single flow rate control valve is provided in the actuator such as hydraulic pressure cylinder and when the stroke is to be controlled by feeding or discharging the working fluid to or from the actuator through the flow rate control valve, the valve body in the flow rate control valve is displaced to one side from the neutral position to feed the working fluid, and is displaced to the other side to discharge the working fluid. The flow rate control valve control device of the invention controls the stroke of the actuator by feedback control, and is provided with the learning device for learning the neutral position, and learns, at all times, the operation amount of the flow rate control valve (e.g., amount of electric current flowing into the coil of an electromagnetic solenoid) so as to assume the neutral position. Therefore, even if the neutral position changes due to a difference inherent in the individual flow rate control valves or due to secular change, the operation amount of the flow rate control valve is corrected by adding the neutral position stored in the learning device to the feedback operation amount, and the position of the valve body in the flow rate control valve is correctly controlled so as to attain a target flow rate. That is, a value of the neutral position that is learned is added as a so-called feedforward value to the control system to compensate for the flow rate characteristics even when the flow rate characteristics are varied, making it possible to avoid deterioration in the response characteristics in the follow-up control of the stroke and to quickly and correctly control the stroke.

Further, the device for learning the neutral position of the invention decides that the neutral position is reached when a rate of change in the detection signal of the stroke sensor becomes smaller than a predetermined value. When the flow rate control valve is at its neutral position, the working fluid is prevented from being fed into, or discharged from, the actuator; i.e., the stroke of the actuator does not change. Therefore, the neutral position is detected upon detecting the rate of change in the detection signal of the stroke sensor that becomes smaller than the predetermined value. The predetermined value is a value close to zero so that the rate of change in the stroke of the actuator that is zero can be detected, and is set by taking into consideration the disturbance to the detection signal of the stroke sensor.

The stroke sensor used for the learning device is a part that has heretofore been used for the control devices for controlling the stroke of the actuator. Therefore, the learning device of the present invention is capable of learning the neutral position without the need of providing any special part. Besides, since only one flow rate control valve is used for the device for controlling the stroke, the control device as a whole can be simply constituted in a compact size.

In the invention of claim 2, the feedback operation amount output by the PID operation unit is an amount that is proportional to a deviation; i.e., the PID operation unit executes a proportional operation (P-operation). When the control operation is executed relying on the feedback operation amount of a proportional operation only, the PID operation unit can be simply constituted.

The invention of claim 3 is applied to the device for controlling the stroke of a clutch actuator that operates the clutch installed between the engine and the transmission in the power transmission device for vehicle. The rate of connecting the clutch of a vehicle must be correctly controlled in a short period of time such as at the time of gear shifting maintaining, particularly, excellent response and stability. When the invention is applied to the device for controlling the clutch actuator, the rate of connection of the clutch can be quickly and correctly varied irrespective of secular change in the flow rate control valve, and the clutch can be controlled free of shift shock.

Here, the device for learning the neutral position of the invention decides that the neutral position is reached when the rate of change in the detection signal of the stroke sensor becomes smaller than the predetermined value. In operating the clutch of a vehicle, a state stably continues for a predetermined period of time in which the rate of change in the stroke remains 0 at a position where the clutch is disconnected. At this moment, the flow rate control valve can be decided to be at its neutral position maintaining good precision. To discriminate a state in which the clutch is disconnected, the stroke of the clutch actuator may be detected to be greater than a predetermined stroke which is close to the position of disconnection. At the time of gear shifting, however, the clutch actuator is quickly brought to the position of disconnection, and often comes into collision with a stopper which mechanically limits the stroke. In this case, too, the rate of change becomes zero at the limit stroke. When the present invention is applied to the device for controlling the stroke of the clutch actuator, therefore, it is desired that the learning is executed when the stroke is greater than a predetermined stroke but is smaller than the limit stroke as in the invention of claim 4. This makes it possible to correctly decide the neutral position of the flow rate control valve.

MODE FOR CARRYING OUT THE INVENTION

Described below with reference to the drawings is an embodiment of when the present invention is applied to a device for controlling the stroke of a clutch for vehicles. However, the clutch for vehicles and equipment constituting the stroke control device to which the invention is applied, are not particularly different from the conventional devices shown in FIG. 4 and other drawings. That is, the clutch for vehicles operated by the stroke control device of the invention is basically the same as the clutch of FIG. 4, and is equipped with a clutch actuator 110 for varying the rate of connection of the clutch. A working fluid is fed to the clutch actuator 110 from a fluid pressure source, and the rate of connection of the clutch is determined by the stroke of the actuator, i.e., by the movement of a piston in the clutch actuator 110. The clutch for vehicles is provided with a stopper 111 which mechanically limits the movement. The stroke of the actuator has a limit stroke.

Figure 1:
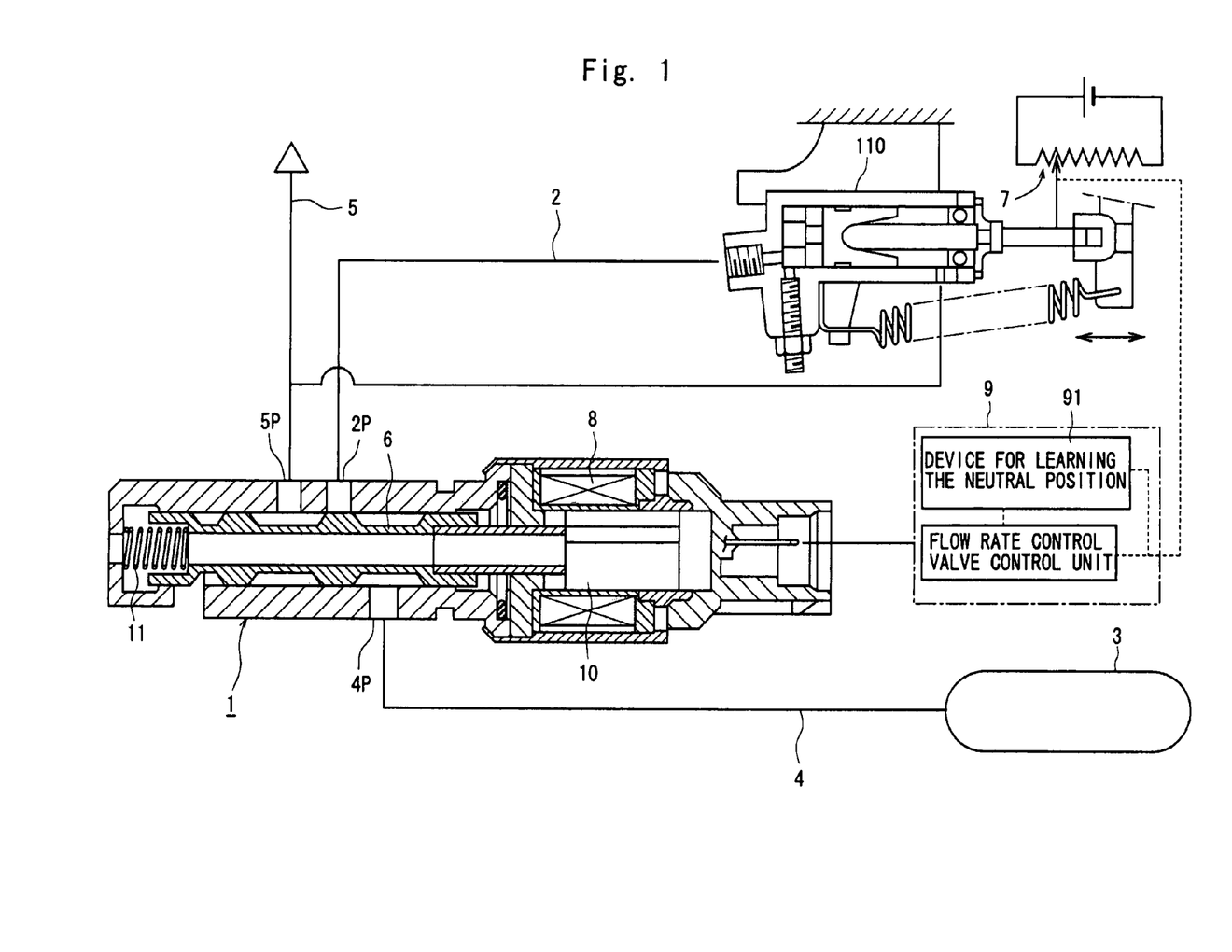
[FIG. 1] is a circuit diagram of a device for controlling the stroke of an actuator according to the present invention.

FIG. 1 shows a circuit constitution of the device for controlling the stroke of the clutch. Equipment constituting the circuit of FIG. 1 are the same as those of the conventional counterparts of FIG. 6 with regard to the so-called hardware, and the corresponding parts are denoted by the same reference numerals. The stroke control device includes a single flow rate control valve 1 driven by an electromagnetic solenoid, the flow rate control valve 1 being connected to a fluid pressure source 3 such as an air tank, to a clutch actuator 110 and to a discharge passage 5. A flow rate control valve control device 9 is so constituted as to execute feedback control so that a real stroke follows up a target stroke, and controls the stroke by changing the position of the valve body 6 by varying the amount of electric current to a coil 8 of the electromagnetic solenoid and by feeding and discharging the working fluid into, and from, the clutch actuator 110. A practical stroke of the clutch actuator 110, i.e., the real stroke is detected by a stroke sensor 7 and its signal is input to the flow rate control valve control device 9.

In the stroke control device of this embodiment, the flow rate control valve control device 9 is equipped with a device 91 for learning the neutral position. By using a signal of a stroke of the clutch actuator 110, the device 91 for learning the neutral position learns and stores the amount of electric current flowing into the coil 8, that corresponds to the neutral position of the flow rate control valve 1, i.e., that corresponds to a position where the flow of the working fluid through the flow rate control valve 1 is cut off. According to the present invention, the flow rate control valve 1 is decided to be at its neutral position when the rate of change in the stroke is substantially zero, and the learning is executed.

The operation of the device 91 for learning the neutral position will be described with reference to a flowchart of FIG. 2. The learning device of this embodiment learns the neutral position at a predetermined operation period. At step S1, a present stroke st(n) is read from a detection signal of the stroke sensor 7, and it is decided at step S11 if the stroke st(n) is larger than a predetermined stroke (stA) but is smaller than a mechanical limit stroke (stM) limited by the stopper 111 (see FIG. 5). The decision is conducted because of the following reasons.

In the practical clutch operation as will be learned from FIG. 5, a state continues in which the rate of change in the stroke becomes zero at a position where the clutch is completely disconnected, and the flow rate control valve 1 is stably held at its neutral position. In this embodiment, therefore, the amount of electric current that flows at the neutral position is learned at the position where the clutch is completely disconnected. At the time of gear shifting, however, the clutch is quickly disconnected, and it often happens that the movement of the clutch actuator goes up to the mechanical limit stroke (stM) limited by the stopper passing over the position of complete disconnection. In this case, too, the rate of change in the stroke becomes 0 but the flow rate control valve 1 is not necessary at is neutral position. Therefore, it is confirmed that the flow rate control valve 1 is at its neutral position where the condition of step S11 is satisfied and, thereafter, the subsequent steps of operation processing are executed.

If the condition of step S11 is satisfied, the routine proceeds to step 2 to find a rate of change in the stroke. The learning device 91 is storing the stroke st(n−1) that was detected last time, and step S2 calculates a differentiated value D(n) which is the rate of change in the stroke, i.e., $$D(n)=(st(n)-st(n-1))/\text{operation period}$$

Next, at step S3, it is decided if D (absolute value) is smaller than a predetermined value. The predetermined value has been set to a small value so that even if the detection signal varies to some extent due to disturbance, the rate of change in the stroke that is 0 can be detected.

If D (absolute value) at step S3 is larger than the predetermined value, it is regarded that the flow rate control valve 1 is not at its neutral position and the operation ends. If it is decided that D (absolute value) is smaller than the predetermined value, the routine proceeds to step 4 where the device 91 for learning the neutral position learns the amount of electric current flowing into the coil 8 of the electromagnetic solenoid at that moment as the amount of electric current at the neutral position. Upon learning the neutral position as described above, the device 91 for learning the neutral position corrects the value learned thus far (e.g., regards an average value of the past learned value and the learned value of this time as a newly learned value). The flow rate control valve control device 9 uses the updated learned value to control the flow rate control valve 1.

Figure 2:
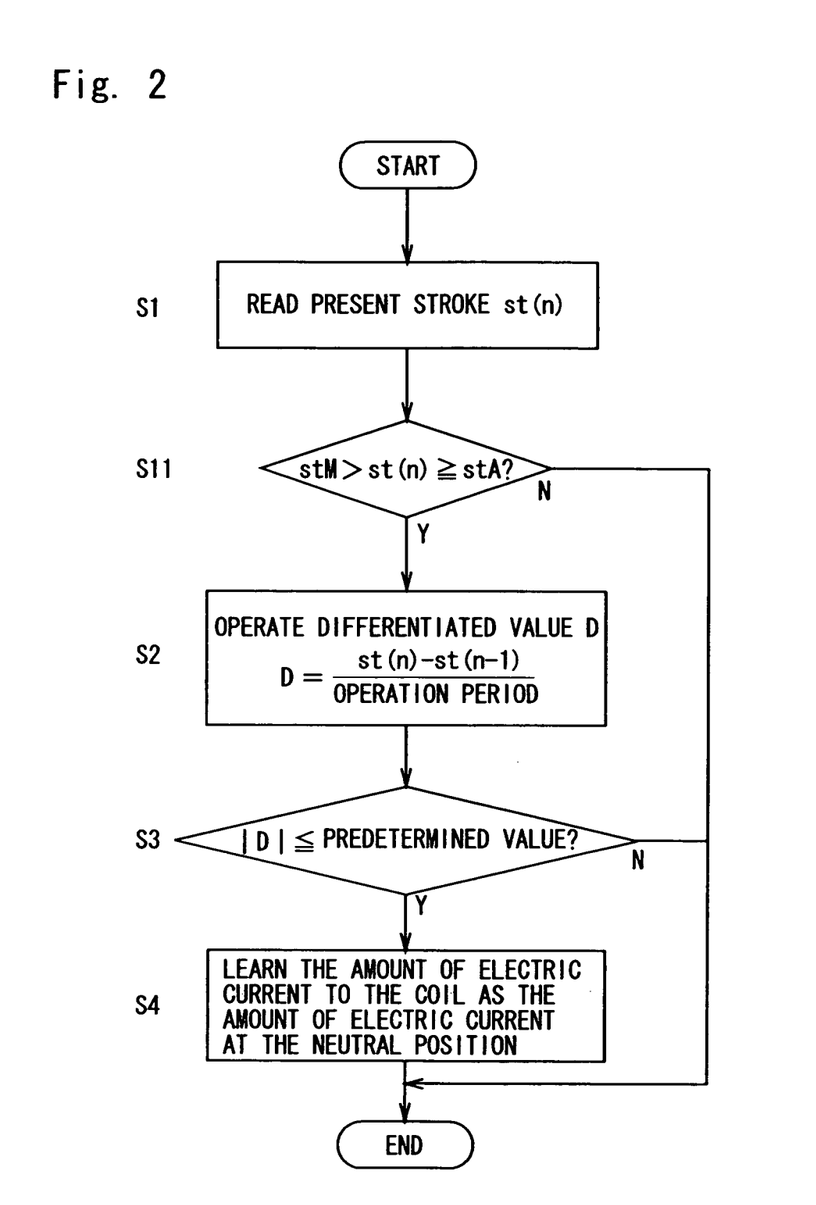
[FIG. 2] is a flowchart of a device for learning the amount of variation in the neutral position according to the present invention.

In the flowchart of FIG. 2, if the differentiated value D operated at step S3 is smaller than a predetermined value, the amount of electric current at that moment is readily detected as the amount of electric current at the neutral position. On the other hand, if the differentiated value becomes smaller than the predetermined value consecutively a plurality of number of times, i.e., if the state where the rate of change in the stroke is 0 continues for a predetermined period of time, then a condition is added for learning the amount of electric current in order to improve the accuracy of learning by precluding disturbance and the like effect. In this embodiment, further, the neutral position is learned at the time of gear shifting. Not being limited to the moment of gear shifting, however, the neutral position may be learned while the vehicle is halting by rendering the transmission to be neutral for a brief period of time to cut off the transmission of the engine power and by operating the stroke of the clutch. Even when the stroke control device of the invention is applied to, for example, an actuator for moving the tail gate up and down, the neutral position of the flow rate control valve can be learned at a moment when the tail gate is once stopped for loading or unloading cargos.

In some of the flow rate control valves, the length L of the land is greater than the width W of the communication port 2p, an dead zone DZ is present in the flow rate characteristics, and the characteristics become as represented by a two-dot chain line in FIG. 8. In such a flow rate control valve, the neutral position of the valve body at which the rate of change becomes 0 (the working fluid is fed to the actuator and is, thereafter, no longer fed) while the stroke is increasing differs from the neutral position of the valve body of when the rate of change becomes 0 (the working fluid is drained and is, thereafter, no longer drained) while the stroke is decreasing. The amounts of electric current corresponding to these two neutral positions become the amounts of electric currents at both ends of the dead zone DZ. In the case of the stroke control device that uses the above flow rate control valve, the amount of the electric current of when the rate of change becomes 0 while the stroke is increasing may be detected separately from the amount of electric current of when the rate of change becomes 0 while the stroke is decreasing, and these amounts may be averaged to find a central point of the neutral positions. Namely, the thus found neutral point may be learned as the above neutral position.

Figure 3:
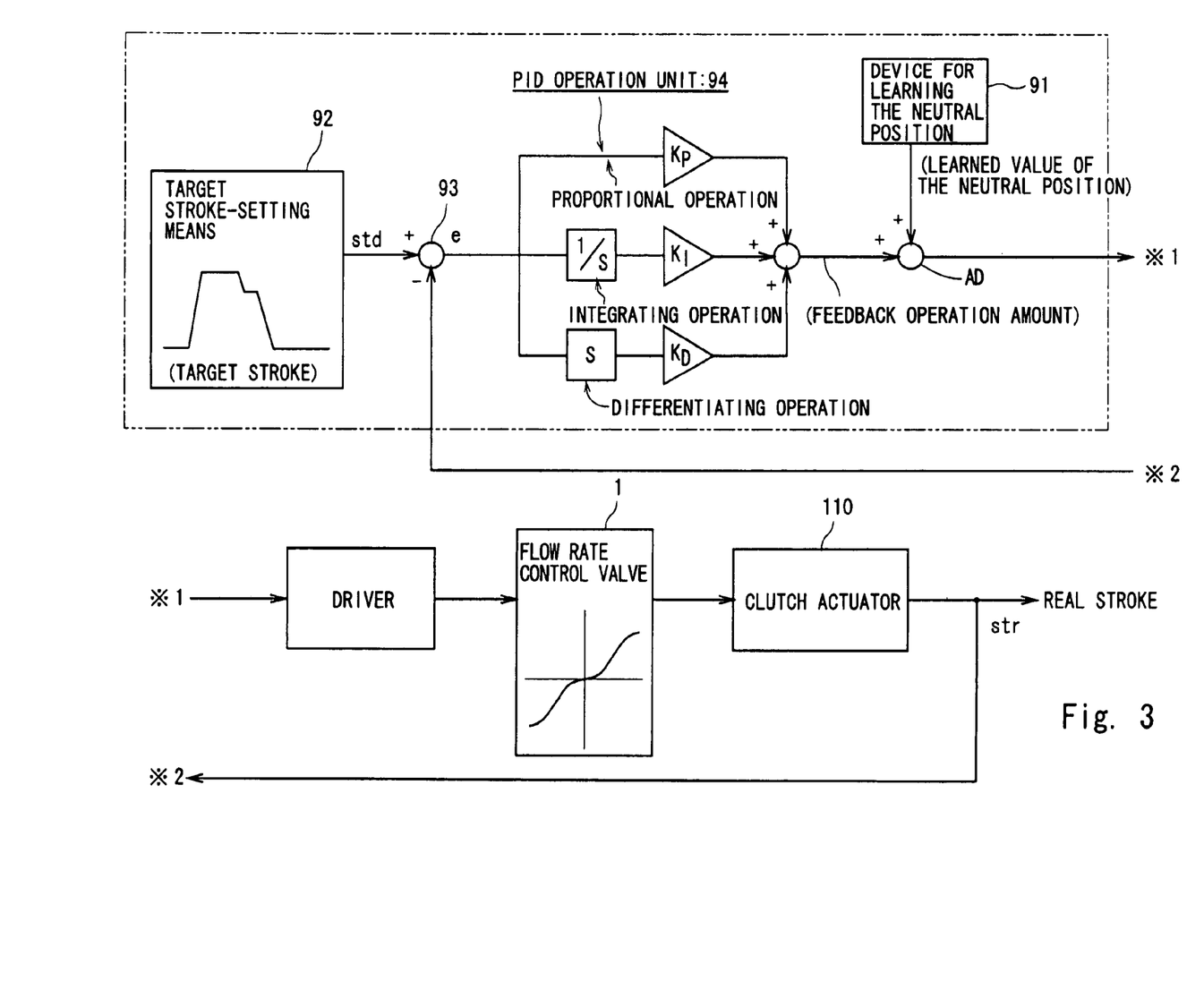
[FIG. 3] is a block diagram of the device for controlling the stroke of the actuator according to the present invention.

FIG. 3 is a block diagram of when the stroke of the clutch actuator is controlled by using the flow rate control valve control device equipped with the neutral position learning device of the present invention.

In operating the clutch for gear shifting, the stroke (rate of connection of the clutch) is controlled so as to vary according to the pattern of FIG. 5 with the passage of time. The flow rate control valve control unit of the flow rate control valve control device 9 is provided with a target stroke-setting means 92 for setting a target stroke of the actuator. Here, the stroke corresponding to the passage of time at the time of gear shifting is set as a target stroke std. The target stroke std is input to a comparator unit 93. The comparator unit 93, at the same time, receives, as a feedback amount, a real stroke str which is the practical stroke detected by the stroke sensor 7, and calculates a deviation e between the target stroke std and the real stroke str.

The flow rate control valve control unit includes a PID operation unit 94 which operates the feedback operation amount for operating the valve actuator (electromagnetic solenoid) based on the deviation e that is input. The PID operation unit 94 is so constituted as to execute the proportional operation+integrating operation+differentiating operation, and operates the operation amount proportional to the deviation e, the operation amount proportional to the integration of time, the operation amount proportional to the differentiation of time, and calculates the feedback operation amount by adding them up together. Here, as is well known in the field of control engineering, in controlling the proportional operation only, the operation amount proportional to the integration of time is added for removing a steady-state deviation that is remaining, and the operation amount proportional to the differentiation of time is added for improving the response in the control characteristics. In a control system that does not require attention in regard to the points mentioned above, the PID operation unit may be simply constituted so as to execute the proportional operation only.

Figure 10:
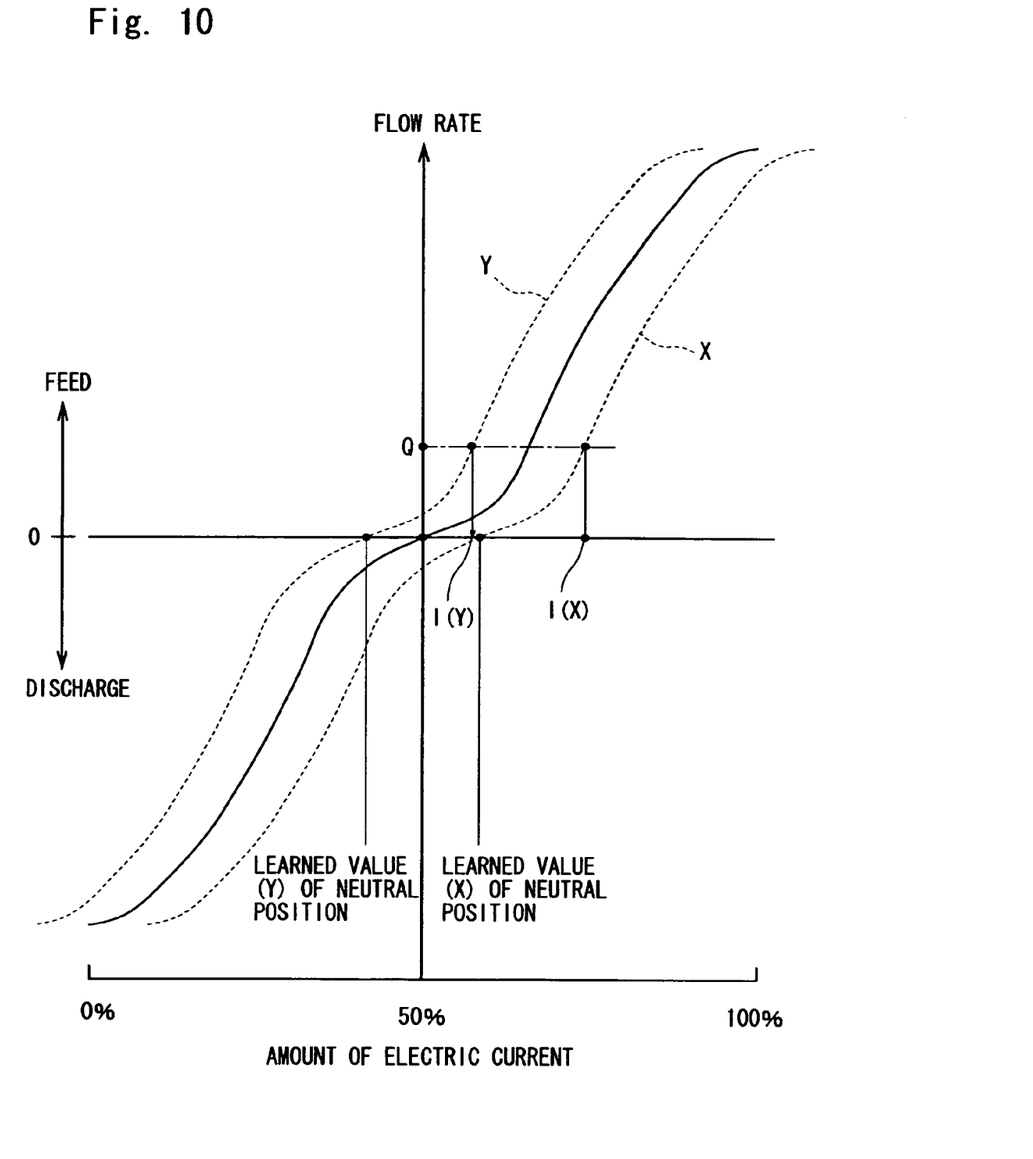
[FIG. 10] is a diagram showing changes in the flow rate characteristics of the flow rate control valve.

The flow rate control valve control device 9 of the present invention is provided with a neutral position learning device 91 which, as described above, learns variation in the neutral position of the flow rate control valve 1 at all times. At a point AD in the block diagram, a learned value of the neutral position is added as a feedforward value to the feedback operation amount that is output from the PID operation unit 94. The learned value of the neutral position reflects a deviation in the neutral position caused by secular change or the like. Upon feeding the learned value of the neutral position as a feedforward value to the operation amount, there can be found the amounts of current I(X) and I(Y) of when the characteristics have varied relative to the same flow rate Q as shown in FIG. 10. That is, a change in the flow rate characteristics of the flow rate control valve is compensated and a proper operation amount is obtained to achieve a target flow rate.

The feedback operation amount to which the learned value of the neutral position is added is input to the driver that feeds an electric current to the electromagnetic solenoid of the valve actuator, and the driver feeds the electric current of an amount corresponding to the added operation amount to the electromagnetic solenoid. Therefore, the valve body in the flow rate control valve 1 is brought to a position corresponding to the feedback operation amount while correcting the amount of variation of the neutral position, and the amount of the working fluid in the clutch actuator 110 and the stroke are properly varied. As a result, the real stroke str is stably and quickly controlled so as to follow up the target stroke std. The varied stroke is detected by the stroke sensor 7 as the real stroke str and is fed back to the comparator unit 93.

INDUSTRIAL APPLICABILITY

According to the present invention as described above in detail, the feedback control device for controlling the stroke of the actuator that uses a single flow rate control valve is provided with a learning device for leaning the variation of the neutral position of the flow rate control valve, and the operation amount at the learned neutral position is added to the feedback operation amount to control the flow rate control valve in order to correctly control the stroke of the actuator. Therefore, the present invention can be industrially utilized as a control device for controlling the stroke of not only the clutch actuator of the clutch control device but also of the actuators, in general, such as pneumatic and hydraulic cylinders.

Though the above embodiment has described the case of controlling the flow rate control valve by using the electromagnetic solenoid and by varying the amount of electric current to the coil thereof, it is also allowable to modify the embodiment in a variety of ways, such as controlling the flow rate control valve by using a pulse motor and by varying the number of pulses (operation amount) or controlling the flow rate control valve by using a hydraulic cylinder as described in the patent document 1.

DESCRIPTION OF REFERENCE NUMERALS

1 flow rate control valve
2 communication passage
4 pressure source passage
5 discharge passage
6 valve body
7 stroke sensor
8 coil
9 flow rate control valve control device
91 device for learning the neutral position
92 target stroke-setting means
94 PID operation unit
110 clutch actuator
111 stopper

The invention claimed is:

1. A device for controlling the stroke of a clutch actuator driven by a working fluid, said clutch actuator operating a clutch installed between an engine and a transmission in a power transmission device for a vehicle, wherein:
    said clutch actuator is provided with a mechanical stopper which limits the stroke of said clutch actuator so that there exists a maximum value of the stroke of said clutch actuator,
    said device for controlling the stroke of a clutch actuator comprises a flow rate control valve for controlling the amount of the working fluid in said clutch actuator, a valve actuator for operating a valve body of said flow rate control valve, a stroke sensor for detecting a real stroke of said clutch actuator, a target stroke-setting means for setting a target stroke of said clutch actuator, and a flow rate control valve control device for controlling said valve actuator depending upon a feedback operation amount which is operated based on a deviation between the real stroke of said clutch actuator and the target stroke; wherein,
    said flow rate control valve is connected to a communication passage communicated with said clutch actuator, to a pressure source passage communicated with a working fluid pressure source, and to a discharge passage for discharging the working fluid from said clutch actuator, and is so constituted that, at the neutral position of said valve body, said communication passage is cut off from said pressure source passage and said discharge passage, and
    said flow rate control valve control device is provided with a neutral position learning device for learning the neutral position of said valve body; wherein,
    said neutral position learning device executes the learning if the stroke of said clutch actuator is greater than a predetermined stroke but is smaller than said maximum value of the stroke, and said neutral position learning device learns, as a neutral position operation amount, an operation amount of said valve actuator at a moment when a rate of change in the detection signal of said stroke sensor becomes smaller than a predetermined value, and
    said flow rate control valve control device controls said valve actuator by correcting said feedback operation amount by the natural position operation amount.

2. The device for controlling the stroke of a clutch actuator according to claim 1, wherein said feedback operation amount is an amount proportional to a deviation between the real stroke of said actuator and the target stroke.

* * * * *